(12) United States Patent
Kelley-Galin

(10) Patent No.: US 9,421,815 B2
(45) Date of Patent: Aug. 23, 2016

(54) PLASTIC SIMULATED STONE AND CERAMIC PRODUCTS MANUFACTURED FROM RECYCLABLE PLASTIC AND METHODS OF MAKING THE SAME

(71) Applicant: Deborah Kelley-Galin, Mancos, CO (US)

(72) Inventor: Deborah Kelley-Galin, Mancos, CO (US)

( * ) Notice: Subject to any disclaimer, the term of this patent is extended or adjusted under 35 U.S.C. 154(b) by 287 days.

(21) Appl. No.: 13/797,934

(22) Filed: Mar. 12, 2013

(65) Prior Publication Data

US 2014/0076485 A1 Mar. 20, 2014

Related U.S. Application Data

(60) Provisional application No. 61/700,882, filed on Sep. 14, 2012.

(51) Int. Cl.
| | |
|---|---|
| *B44C 5/06* | (2006.01) |
| *B44F 9/00* | (2006.01) |
| *B29B 17/00* | (2006.01) |
| *B29L 31/00* | (2006.01) |
| *B29L 7/00* | (2006.01) |

(52) U.S. Cl.
CPC .............. *B44C 5/06* (2013.01); *B29B 17/0042* (2013.01); *B44F 9/00* (2013.01); *B29L 2007/008* (2013.01); *B29L 2031/7128* (2013.01); *Y02W 30/62* (2015.05); *Y10T 156/1043* (2015.01); *Y10T 156/1052* (2015.01)

(58) Field of Classification Search
CPC ........................................................ B44C 5/06
USPC .................................................. 156/300–302
See application file for complete search history.

(56) References Cited

U.S. PATENT DOCUMENTS

| | | | |
|---|---|---|---|
| 3,017,714 A * | 1/1962 | Slosberg et al. | ............... 264/109 |
| 2006/0147655 A1* | 7/2006 | Schober | ..................... B43L 3/00 |
| | | | 428/13 |
| 2008/0264559 A1* | 10/2008 | Akhtar et al. | .................. 156/277 |

FOREIGN PATENT DOCUMENTS

AU           61991/96 B  *  2/1997

* cited by examiner

*Primary Examiner* — Jeff Aftergut
(74) *Attorney, Agent, or Firm* — Cygnet IP Law, P.A.; Stephen W. Aycock, II

(57) ABSTRACT

Simulated stone, clay, and transferware and jewelry blanks and ornaments and a process for their preparation using new or reclaimed low density polyethylene sheets such as bags and or other suitable materials. Some implementations can include inclusions. The process can include heating layers of low density polyethylene plastic (LDPE) or other suitable materials under about 100 lbs. of pressure with sheets of specifically treated plastic inclusions to replicate characteristics of stones such as, for example, turquoise and marble. Some implementations can replicate historic and prehistoric materials such as painted earthenware ceramics and porcelain transferware. Some implementations can include a processed craft material that may receive final processing by off-site craftspeople with a household iron. Final components may be cut manually or die-cut either manually or mechanically.

14 Claims, 1 Drawing Sheet

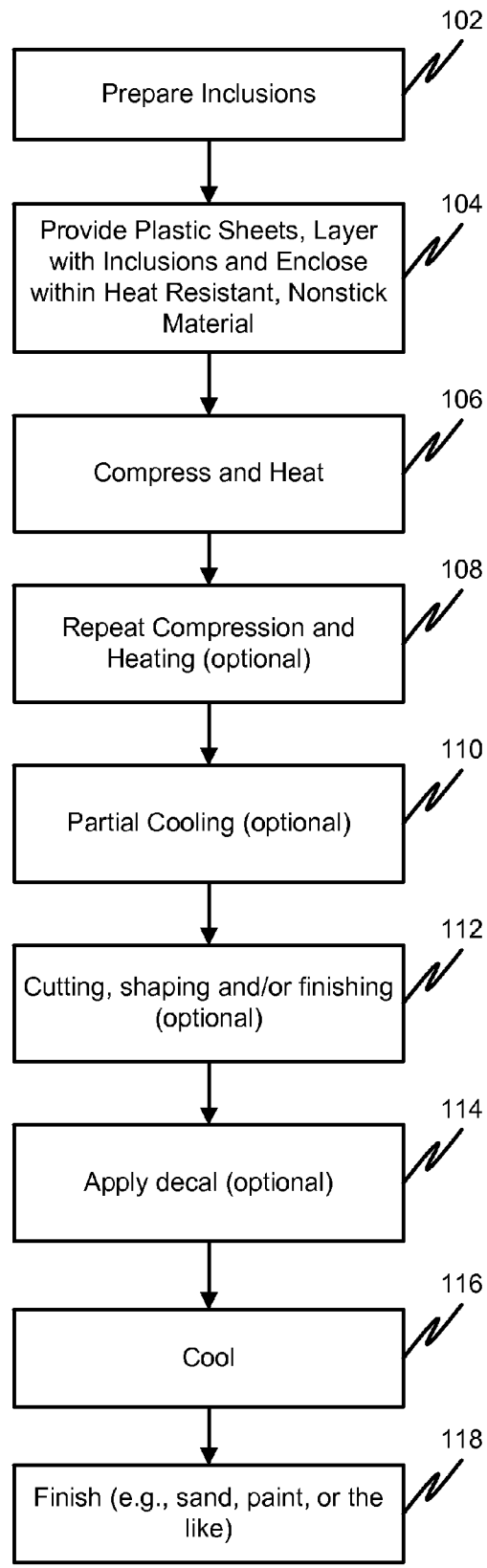

PLASTIC SIMULATED STONE AND CERAMIC PRODUCTS MANUFACTURED FROM RECYCLABLE PLASTIC AND METHODS OF MAKING THE SAME

RELATED APPLICATIONS

This application claims the benefit of U.S. Provisional Application No. 61/700,882, entitled "Process and Resulting Plastic Simulated Stone or Ceramic Product for Jewelry and Ornaments Manufactured from Recyclable Plastic" and filed on Sep. 14, 2012, which is incorporated herein by reference in its entirety.

FIELD

One or more of the embodiments relate in general to simulated stone or ceramic blanks used for jewelry and ornament making. In particular, one or more embodiments can include a method of processing new or waste low density polyethylene (LDPE) or similar material such as used grocery bags to create simulated stone, metal, and ceramic components.

BACKGROUND

The need to utilize or repurpose waste plastics such as bags or wrappings made from low density polyethylene and similar materials is well known. The growing demand for low-cost jewelry or ornament blanks is also known. For example, while individual turquoise mines are known for the unique colors of their stones, the high costs of production have forced some mines to cease operation. The colored stones produced by these former operations are both scarce and costly, making them unavailable to jewelers and craftspeople. In addition, replicas of historic and prehistoric jewelry and ornaments featuring pottery or china shards can be difficult and time-consuming to construct through ceramic methods, and the availability and use of original artifact materials may be restricted or prohibited.

As a result, traditional materials such as gems, decorative ceramic pieces, and stones are becoming increasingly costly to jewelers and craftspeople or can be unavailable altogether. However, these traditional materials can be simulated or replicated by a low cost heat process utilizing LDPE or other suitable materials. The resulting jewelry or ornament components meet increasing consumer demand for products made from non-biodegradable LDPE or other suitable materials, particularly bags and product packaging that might otherwise be destined for local landfills.

SUMMARY

One or more of the embodiments can include a method for forming plastic resulting in artificial jewelry blank materials and ornaments. A heated press is used to produce the various embodiments through compression, lamination, bonding, and fusion. Additional three-dimensional effects, including rounded tops such as those of cabochons, can be created by shaping warm material on convex surfaces, including slump molds, either manually with external heat source such as a heat gun or in vacuum form units.

One or more embodiments can include a solid plastic recycled product that simulates the appearance of semi-precious stones, ceramic, metal, and pottery or ceramics. The resulting product is manufactured from heated layers of LDPE or other suitable materials with specific inclusions selected to achieve the appearance of the material being simulated. The material resulting from the processes described herein may be cut to produce ornamental blanks such as those traditionally used in jewelry making and crafts or functional, decorative applications such as book or notebook covers. The material may be prepared without inclusions for craft applications that involve the later addition of inclusions or topical applications through additional heating and bonding through heat or heat and compression sources such as a household iron. The material may be prepared with topical commercial decals for additional craft processing and purposes, especially when replicating the appearance of ceramic transferware. Three-dimensional effects may achieved by the post-production consumer when the processed or base material is obtained for craft purposes.

For example, LDPE plastic bags and used plastic shopping bags or other similar suitable materials can be heated and compressed into a solid material with layers of acrylic or enamel-based colorants that simulate the appearance of semi-precious stones such as turquoise or metals such as gold, silver, brass, or bronze.

One or more embodiments can include colored LDPE or other suitable materials that contain cut plastic inclusions arranged to simulate ornamental designs including those found on historic or prehistoric Native American pottery.

One or more embodiments can include white or similarly toned or colored LDPE or other suitable materials that may be used to produce the ornamental effect of hand painted china, porcelain or other ceramic materials through the topical addition commercial transferware decals or self-produced water slide transfers. The process does not require the lengthy and expensive high temperature kiln fire process necessary for genuine ceramic and pottery jewelry or ornament components.

One or more embodiments can include transparent LDPE or other suitable materials and enamel colorants that are heated above the temperatures required for lamination and bonding to produce the effect of transparent semi-precious stones such as moss agate.

One or more embodiments can include a coating of a clear sealing agent for additional hardening and shine.

One or more embodiments may include the additional processing of partially cooled materials with or without inclusions on hump molds or in vacuum forming machines to produce 3-dimensional forms that may be used for purposes including applications for jewelry or ornament production.

One or more embodiments may include the use of a die-cut machine or press.

Simulated stone, metal, marble, painted earthenware and replica transferware made from new or waste LDPE or other suitable material for use as ornaments, functional elements such as notebook covers, or components in jewelry making and other crafts.

Processed sheets of craft material composed of new or waste LDPE or other suitable material are made from which artists and craftspeople can produce simulated stone, metal, marble, painted earthenware and replica transferware for use as ornaments, functional elements such as notebook covers, or components in jewelry making through additional heating, pressing, and bonding with a household iron.

One or more embodiments can include replica painted earthenware pottery pieces and shards or replica painted earthenware pottery shards or replica transferware for use as ornaments, functional elements such as notebook covers, or components in jewelry making made from new or waste LDPE or other suitable material.

BRIEF DESCRIPTION OF THE DRAWINGS

FIG. 1 is a flow chart of an example method for a production process for one or more embodiments with or without inclusions or bonded surface additions.

DETAILED DESCRIPTION

FIG. 1 is a flow chart of an example method 100 for making plastic simulated stone, simulated ceramic and other simulated materials from recyclable plastic. The process begins at 102, where inclusions are provided and/or prepared based on the type of simulated materials being contemplated.

The inclusions may be an upper and lower layer of painted plastic bonded to an approximately ⅛" thick base of bonded or fused sheets of LDPE or other suitable materials with a transparent cover layer or layers. For example, the cover layer or layers may be single or multiple ply transparent LDPE or other suitable materials as required for desired visual effect. The inclusions may be cut and arranged elements of colored LDPE or other suitable materials with a single or multiple ply transparent LDPE layer covering or similar covering of other suitable materials. The inclusions may be a top layer of colored plastic such as white that will serve as a ground for the final fusing of a commercial slide transfer decal prior to final cooling phase of production or after a sheet of the product has been acquired by a craftsperson who has reheated and fused the commercial hobbyist ceramics decal to the material between sheets of cooking parchment or other suitable heat resistant nonstick barrier material with a household iron.

Some inclusions may benefit from being coated with a material to help them adhere to the plastic. For example, coating paper or fabric with an acrylic or other plastic fixative can allow it to bond with the plastic bag material. The process continues to 104.

At 104, layers of plastic base material are assembled along with any inclusions. The inclusions can be interspersed between at least two layers of the plastic base material. The composite of the layers of plastic base material and inclusions are placed inside a heat resistant, nonstick barrier material. The types of transparent bags that can be used are usually sold in stores as "storage" or "freezer" bags. While "shopping bags" are able to be used, the shopping bags may not be used as frequently as the transparent type. The storage and freezer bags may made from plastic that is around 1 mil to 4 mil thick. The process continues to 106.

At 106, the material is processed under heat and pressure. For example, the material may be placed in a press such as a Simplicity Quick Press iron. Example temperature and pressure ranges are described below in connection with the example embodiments. In addition to the first heat and pressure treatment, some embodiments may be treated again by a craftsperson using a press as described above or other heated tool such as a clothes iron. A user can check the material every 20-30 seconds during the heating process to gauge the completion rate of the heating process.

The number of layers of LDPE (or other material) may affect the time it takes to bond the material. For example, forty-eight layers of 2 mil. LDPE can be melted and bond in about 60 seconds at 284 degrees F. This will result in an end product material being about 1/16" thick. Optimum width for a final simulated stone or ceramic product would probably be no thinner than that most of the time.

In another example, 24 sheets heated for 30 seconds would work for a notebook cover. Anything thicker than 1/16" would take a bit longer, around 60 seconds to 90 seconds approximately, but it would relate directly to the number of layers of plastic and the thickness of the plastic. The process continues to 108.

At 108, the heating and compression are optionally repeated until a desired ornamental effect is achieved. The process continues to 110.

At 110, the material is optionally partially cooled. For example, the material can be cooled to around 110 degrees F. The process continues to 112.

At 112, the material formed by the heating and pressure can be shaped. For example, the material may be cut, shaped, and/or finished to create a jewelry blank, ornament, functional craft element, or the like. Finishing may include sealing with a suitable coating. The process continues to 114.

At 114, decals or other exterior elements may be optionally applied. The process continues to 116.

At 116, the material is cooled. The process continues to 118.

At 118, the blanks or other elements are optionally given a final finishing treatment. The final finishing treatment can include sanding and/or finishing for a desired effect or application. For example, pieces may be painted with paint suitable for use on plastics. Craft elements may be trimmed and the trimmings may be reserved for subsequent reheating and use. It will be appreciated that steps 102-118 may be repeated in whole or in part in order to accomplish a contemplated manufacturing process.

Example Embodiment 1

White or Clear Base Material

One or more embodiments may include white or similarly light-toned LDPE base materials or other suitable materials that may be used to produce the ornamental effect of hand painted china, porcelain or other ceramic materials through the topical addition commercial transfer-ware decals or self-produced water slide transfers. One or more of the following steps correspond to the steps shown in FIG. 1.

Layered LDPE bags or bags of other suitable material covered top and bottom with heat resistant cooking parchment or other suitable heat resistant nonstick barrier material (104) are placed in a heat press and pressed with approximately 100 lbs. of pressure at a temperature in the range of about 284-320 degrees Fahrenheit. (106)

Material can be evenly heated both top and bottom for approximately 45 second-90 seconds until fused. Heating and pressing time can vary base on material thickness and number of layers (e.g., number of bag layers). However, progress should be monitored continuously about every 20-30 seconds, for example. Completion may take as little as 45 seconds. Additional bags may be added after partial cooling for additional heat pressing as necessary to result in desired thickness of approximately ⅛". (108)

Fused base material is allowed to cool while still adhered to cooking parchment or other suitable heat resistant nonstick barrier material. (110)

Partially cool (112), cut to shape and finish (114). When provided with simple additional instructions, artists and craftspeople can use the base material to produce simulated stone, metal, painted earthenware, and replica hand painted ceramic or transferware using commercial hobbyist decals through additional heating, pressing, and bonding with a household iron (114). Trim sheets for clean edges and reserve trimmed sheet for future reheating, processing, cutting, and use in craft purposes (118).

Example Embodiment 2

Artificial Stone Base Material

One or more embodiments may include layers of acrylic or enamel-based colorants that simulate the appearance of semi-precious stones such as turquoise.

Two single layers of low density polyethylene bags can be painted solid with opaque acrylic polymer paint and allowed to dry (102). Colors should be applied with fast solid brush marks in no particular pattern. Colors should approximate those of stone to be reproduced. For example, simulated turquoise will require solid, random brush marks of blue and aqua green. Sheets intended for marble effects, for example, could contain painted streaks of white and assorted browns. The subsequent heating, pressing, and fusing process will result in redistribution of pigments in matrix or other natural effect according to the intent of the painted layer inclusion.

Ten to twenty clean, clear low density polyethylene bags of similar size, usually ranging from 2 to 4 mil. can be loosely stacked between two pieces of heat resistant cooking parchment or other suitable heat resistant nonstick barrier material (104). The painted plastic sheets should be arranged face out on the top and bottom of stack and should be covered with single or multiple layers of transparent LDPE or similar material. For example, the cover layer may be two layers of 2 mil. transparent material or 1 layer of 4 mil. transparent material. Number of bags chosen should result in a finished fused material of approximately ⅛" thickness or, alternately, by the thickness required by the jewelry findings, ornament frame or other application. Exact number of bags can be determined by original thickness of layers of uniform new LDPE or other suitable materials or assorted waste LDPE bags or other suitable materials.

The layered stack of LDPE bags or other suitable materials are covered top and bottom with heat resistant cooking parchment or other heat resistant nonstick barrier material and are placed in heat press (104). Approximately 100 psi of pressure is applied at a temperature range from about 284-320 degrees Fahrenheit (106). Material should be evenly heated both top and bottom for approximately 45 seconds to 90 seconds until fused. Heat and pressure should be applied to both sides of material; depending on heat press unit, the material may need to be turned frequently to maintain even heating and pressure on both sides. Time varies per thickness and number of polyethylene bags. Progress must be monitored continuously or about every 20-30 seconds, for example. Completion times vary according the material and thickness but may take as little as 45 seconds. For simulated moss agate effect, temperature should be raised up to about 350 degrees Fahrenheit to more thoroughly melt LDPE or other suitable material as well as to melt and disperse colorant for appearance of feathery linear striations in a transparent ground.

Material is allowed to partially cool between cooking parchment or other suitable heat resistant nonstick barrier material until parchment or other material can be peeled off surface without curling (110).

While material is still warm to the touch, jewelry or ornament blanks can be manually cut or die-cut either mechanically or manually from simulated stone base material (112).

Lightly sand edges of cooled jewelry blanks and complete finishing processes as necessary for specific embodiments (112). For natural stone matrix-effects, lightly melt edges of simulated stone blanks with candle flame and lightly wipe while edges cool. Tint edges of earthenware blanks with light brushings of paint developed for LDPE or other suitable plastic applications. Additional finishing includes drilling or other processes required for intended use.

Example Embodiment 3

Simulated Metal Jewelry Blanks

One or more embodiments may include layers of acrylic or enamel-based colorants that simulate the appearance of metals such as gold, silver, brass, or bronze.

Assemble and process materials as for simulated turquoise or stone, using metallic brushed paint, spray paint, or metallic colored opaque LDPE for colored inclusion sheets 102, 104, and cut to shape 112 and finish 112.

Example Embodiment 4

Imitation Earthenware Pottery Shard Base Material with or without Replicated Designs One or more embodiments may reproduce the effect of hand painted prehistoric or historic earthenware pottery.

Assemble and process materials as for simulated turquoise or stone, but use plastic coated with earthenware colored spray paint developed for LDPE or other plastic applications as base color layer. For replica painted geometric design effects, place cut colored LDPE plastic bag design elements from sources such as black garbage bags in position prior to heat pressing final layers of transparent plastic on top and bottom 1, 2, partially cool 5, and cut to shape 6 and finish 6.

Example Embodiment 5

Replicated China or Porcelain Blanks with Commercial Transferware Decals

One or more embodiments may reproduce the ornamental effect of hand painted china, porcelain or other ceramic materials through the topical addition commercial transferware decals or self-produced water slide transfers. The process does not require the lengthy and expensive high temperature kiln fire process necessary for genuine ceramic and pottery jewelry or ornament components.

Prepare base material using white LDPE material such as bags or white outer layers of LDPE on other colored LDPE layers (102-110).

Upon completion of white-covered base material, place water-slide enamel decal on top layer. Heat set decal in place until bonded (114). Jewelry or ornament blank may then be cut, shaped, sanded, and finished as required intended application (112, 118).

Example Embodiment 6

Consumer Craft Uses of Final Processed Material or Base Material

One or more embodiments may include a craft material that can be used by the consumer for craft project purposes such as notebook covers. The consumer may use processed base material to create the effects of simulated stone, metal, hand painted porcelain or ceramic transferware blanks, or painted earthenware using additional inclusions and a household iron.

When provided with instructions, artists and craftspeople can use sheets of previously produced base material as a core on which to layer inclusions to create simulated stone, metal blanks for jewelry or ornament purposes using cooking parchment or other suitable heat resistant nonstick barrier material, inclusions, and transparent cover LDPE sheets or sheets of other suitable material using a heat press or household iron (e.g., 102-118). In addition, base material can be augmented with either colored plastic inclusions or topical application of commercial hobbyist ceramic decals to replicate painted earthenware or replica hand painted ceramic or transferware ceramic blanks by heating, pressing, and bonding with heat press or a household iron. Partially cool (110), cut to shape (112), and finish (118).

One or more embodiments may include covering the pendant blank or ornament with suitable clear sealants for additional hardening or shine after edge treatments.

One or more embodiments may include the additional processing of partially cooled materials with (116) or without inclusions (110) on hump molds or in vacuum forming machines to produce three dimensional forms such as cabochons that may be used for jewelry or ornaments applications or other craft applications.

One or more embodiments can also include simulated shell material (e.g., mother-of-pearl, abalone, other shells and/or opalescent stones). Shell material embodiments can be made using opalescent paints and layering of one or more other prepared sheets of plastic material to accomplish an effect of natural impurities or imperfections.

One or more embodiments may include layers of acrylic or enamel-based colorants that simulate the appearance of opalescent materials including mother-of-pearl, abalone, other shells, and opaque opalescent stones.

Assemble and process materials as for simulated turquoise or stone, using opalescent brushed paint, spray paint, or metallic colored opaque LDPE for colored inclusion sheets 102, 104, and cut to shape 112 and finish 112. To create the effect of natural impurities sometimes found in these materials, a separate hand painted inclusion sheet may be layered above the opalescent base prior to processing with heat press.

While embodiments have been described above in connection with replicating traditional jewelry and ornament materials, it will be appreciated that any desirable effect can be achieved through the use of multiple inclusions and/or layers of inclusions. Also, in addition to or as an alternative to LDPE, other post-consumer plastics having suitable properties (e.g., compatible melting point) may be used (e.g., HDPE).

One or more embodiments can include embossing the material (before, during or after heating). In addition to the creation of effects that replicate natural stone, shell, and traditional jewelry materials such as pottery and ceramics, a wide variety of representational, decorative, and abstract designs may be produced through the inclusion of suitable bondable materials, including layers of treated LDPE sheets or non-plastic materials that have been treated with bondable substances including adhesives and acrylic or other sealants with compatible melting points.

Further visual and structural effects may be produced by compressing, laminating, bonding, and/or fusing multiple layers of painted or suitably prepared LDPE sheets or other similar materials, including thin layers of post-consumer plastic that can be adequately processed and bonded to LDPE within the described temperature range.

It is therefore apparent that there is provided in accordance with the various embodiments disclosed herein, plastic simulated stone and ceramic product manufactured from recyclable plastic and methods of making the same.

While the disclosed subject matter has been described in conjunction of a number of embodiments, it is evident that many alternatives, modifications and variations would be or are evident to those of ordinary skill in the applicable arts. Accordingly, Applicant intends to embrace all such alternatives, modifications, equivalent and variations that are within the spirit and scope of the disclosed subject matter.

What is claimed is:

1. A method comprising:
    providing a plurality of plastic sheets, each plastic sheet formed from low density polyethylene (LDPE) material;
    providing one or more inclusions formed from low density polyethylene (LDPE) material and a colorant;
    placing the one or more inclusions and a colorant between at least two of the plastic sheets to form a composite raw material;
    compressing the composite raw material;
    applying heat during the compressing so as to cause the composite raw material to form into a single piece of material;
    removing compression from the single piece of material; and
    cooling the single piece of material, wherein the cooling is performed while the single piece of material is disposed between sheets of a heat resistant nonstick barrier material, and wherein the cooling is performed with pressure removed from the single piece of material.

2. The method of claim 1, further comprising:
    partially cooling the single piece of material; and
    shaping the partially cooled single piece of material.

3. The method of claim 2, wherein the shaping includes cutting.

4. The method of claim 2, wherein the shaping includes molding.

5. The method of claim 1, further comprising applying a finish coat to the single piece of material.

6. The method of claim 1, further comprising applying a decal to the single piece of material.

7. The method of claim 1, wherein the one or more inclusions includes one or more painted plastic sheets.

8. The method of claim 1, wherein the one or more inclusions are arranged so as to cause the single piece of material to resemble stone.

9. The method of claim 1, wherein the one or more inclusions are arranged so as to cause the single piece of material to resemble pottery.

10. The method of claim 1, wherein the one or more inclusions are arranged so as to cause the single piece of material to resemble shell.

11. The method of claim 1, wherein the compressing includes compressing at a pressure of about 100 psi.

12. The method of claim 1, wherein the heating includes heating in a range of about 284 to about 320 degrees Fahrenheit.

13. The method of claim 1, wherein the single piece of material comprises a blank for jewelry.

14. The method of claim 1, wherein the LDPE inclusions are transparent.

* * * * *